United States Patent [19]

Cutter

[11] 4,167,996
[45] Sep. 18, 1979

[54] SUSPENSION TYPE CLAMPING TRANSPORT HOOK

[75] Inventor: Delbert M. Cutter, Swartz Creek, Mich.

[73] Assignee: General Motors Corporation, Detroit, Mich.

[21] Appl. No.: 890,691

[22] Filed: Mar. 27, 1978

[51] Int. Cl.$^2$ .................. B65G 17/16; B65G 17/46; B65G 17/32
[52] U.S. Cl. .................................. 198/678; 198/650; 198/653; 294/116; 294/118
[58] Field of Search ............... 198/650, 653, 479, 694, 198/682, 678; 214/1 BA; 294/116, 118, 106; 271/204, 205, 206, 277

[56] References Cited
U.S. PATENT DOCUMENTS

| | | | |
|---|---|---|---|
| 2,103,850 | 12/1937 | Hinsey | 198/678 |
| 2,804,965 | 9/1957 | Anderson | 198/682 |
| 3,697,117 | 10/1972 | Larson | 294/118 |
| 3,807,786 | 4/1974 | Alegria | 294/116 |
| 3,869,053 | 3/1975 | Gilbank | 198/678 |
| 3,960,264 | 6/1976 | Carbine | 198/650 |

*Primary Examiner*—Robert B. Reeves
*Assistant Examiner*—Brian M. Bond
*Attorney, Agent, or Firm*—Edward J. Biskup

[57] ABSTRACT

A transport hook for suspending and supporting a sheet metal article from an elevated conveyor chain that includes a base member having a pair of jaw members connected thereto. A spring extends between the jaw members for normally maintaining the latter in an open position and one of the jaw members is formed with a support portion that is adapted to have the article mounted thereon so as to cause the weight of the article to draw the jaw members into clamping engagement with the article against the bias of the spring.

3 Claims, 4 Drawing Figures

SUSPENSION TYPE CLAMPING TRANSPORT HOOK

This invention concerns material handling equipment in general and more particularly relates to a transport hook for supporting an article while the latter is being conveyed from one work station to another.

More specifically, the invention contemplates a transport hook which serves to suspend and support an article from an elevated conveyor chain and comprises a base which is adapted to be pivotally attached to the chain. The transport hook includes first and second jaw members with the first jaw member being mounted on the base for pivotal movement about a first axis. The second jaw member has an upper end and a lower end with a portion therebetween being pivotally mounted to the first jaw member for movement about a second pivot axis. A spring interconnects the jaw members and serves to normally maintain the latter in an open position. The lower end of the second jaw member is formed with a support portion which is adapted to have the article mounted thereon so as to cause the weight of the article to draw the first jaw member downwardly relative to the base and simultaneously cause the first jaw member to pivot about the first axis against the bias of the spring and thereby cause the jaw members to move into clamping engagement with the article.

The objects of the present invention are to provide a new and improved transport hook that serves to support an article while being moved from one area in a plant to another; to provide a new and improved article support device that is attachable to a chain conveyor and includes a pair of normally open jaws which are closed in a clamping fashion when an article is mounted on one of the jaws; to provide a new and improved device that serves to transport sheet metal components and provides a clamping force on the components that is related to the weight of the latter; and to provide a new and improved chain conveyor drawn support device that serves to carry a large sheet metal article and has a pair of pivotally interconnected jaws one of which is pivotally mounted on a base member in a manner that allows the jaw members to apply a clamping force onto the article when the latter is hooked onto the other of the jaw members.

Other objects and advantages of the invention will be more apparent from the following detailed description when taken with the drawings in which.

Figure 1:
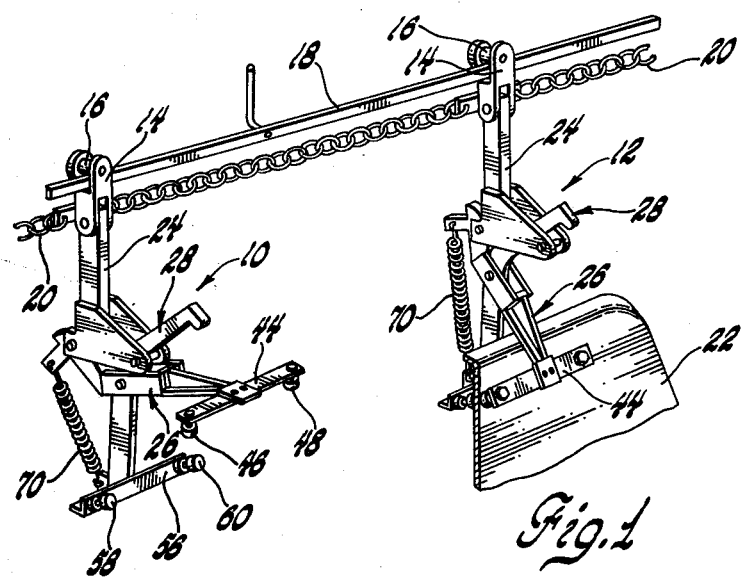
FIG. 1 is a perspective view showing two identical transport hooks made in accordance to the invention and connected to a chain conveyor.
Figure 3:
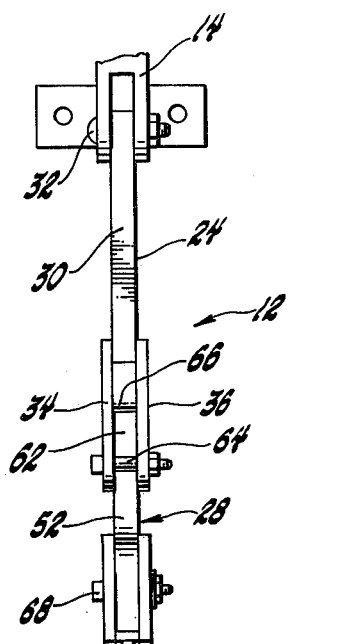
FIG. 3 is an end view of the transport hook of FIG. 2 taken on lines 3—3 thereof.

Referring to the drawings and more particularly FIG. 1 thereof, a pair of identical transport hooks according to the invention are shown and identified by the reference numerals 10 and 12. Each of the transport hooks 10 and 12 has the upper end thereof pivotally connected to a support member 14 which includes a roller 16 adapted to move along a fixed elevated horizontal rail 18. A chain 20 interconnects adjacent transport hooks and serves to convey the latter along the rail 18 while carrying an article such as the sheet metal vehicle hood indicated by the reference numeral 22 in FIG. 1. It will be noted that the transport hook 10 is in the open position while the other transport hook 12 is in the closed position and carries the hood 22.

Figure 2:
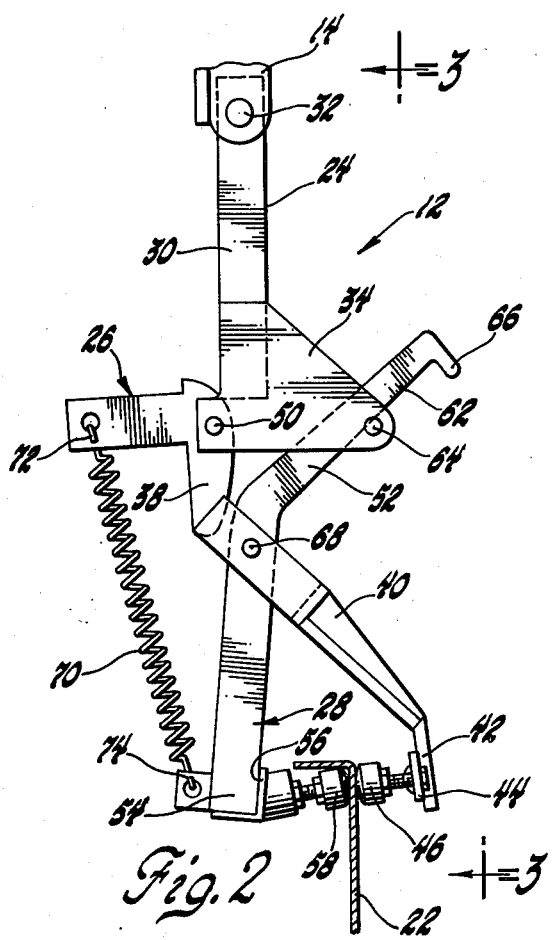
FIG. 2 is an enlarged elevational view showing of the transport hook seen in FIG. 1 that is in a closed position and supporting a sheet metal article.
Figure 4:
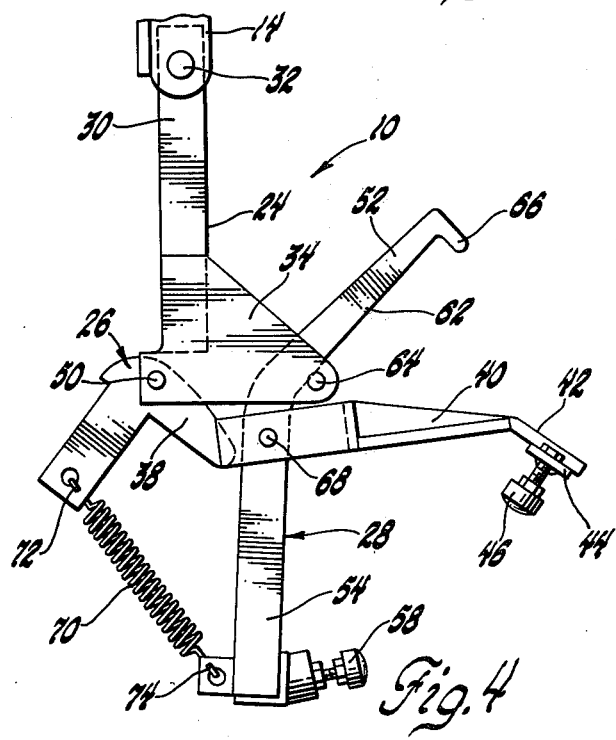
FIG. 4 is an enlarged elevational view showing the other transport hook illustrated in FIG. 1 shown in an open position.

As seen in FIGS. 2 and 4, each transport hook 10 and 12 comprises a base member 24 and a pair of jaw members 26 and 28. The base member 24 includes an upright bar portion 30, the upper end of which is connected to the support member 14 by a pivotal connection 32. The lower end of the bar portion 30 is fixed with a clevis that is formed by a pair of parallel and triangularly shaped plates 34 and 36 between which each of the jaw members is located.

The jaw member 26 consists of an L-shaped mounting section 38 fixed with a generally straight section 40 which, in turn, is secured to a support portion 42. The support portion 42 includes a horizontal bar member 44 which has a pair of identical contact buttons 46 and 48 adjustably mounted thereon. A pin 50 pivotally connects the mounting section 38 of the jaw member to the clevis for pivotal movement about a horizontal axis.

The jaw member 28 is V-shaped and consists of an upper guide portion 52 and a lower support portion 54 which also includes a horizontal bar member 56 which carries a pair of contact buttons 58 and 60 that can be adjusted axially relative to the associated bar member. The guide portion 52 extends between the plates 34 and 36 of the clevis and has an outer edge 62 which normally engages a pin 64 secured between the plates. The guide portion terminates with a right angle tab 66 which can serve as a stop if it should engage the pin 64. It will be noted that the straight section 40 of the jaw member 26 is in part formed by two plates between which the jaw member 28 extends with an intermediate portion of the latter being pivotally connected to the jaw member 26 by a pin 68 whereby the jaw members can rotate relative to each other about a horizontal axis passing through the center of the pin 68.

A coil spring 70 has the opposite ends 72 and 74 thereof connected to the jaw members 26 and 28 respectively and serves to maintain the transport hook in the normal open position as seen in FIG. 4. In this connection, it will be noted that when the transport hook is in the open position, the spring 70 causes the straight section 40 of the jaw member 26 to be positioned adjacent the clevis while the guide portion 52 is raised upwardly relative to the clevis. However, when a sheet metal article such as the hood shown in FIG. 1 is hooked onto contact buttons 58 and 60 of the support portion of jaw member 28, the latter is drawn downwardly by the weight of the article and causes the jaw member 26 to pivot in a clockwise direction about the pin 50. This compound movement results in the support portions 42 and 54 moving towards each other to clamp the article therebetween. It should be apparent that the greater the weight of the article, the greater the clamping force exerted by the contact buttons 46, 48 and 58, 60 onto the article. It will also be noted that as seen in FIG. 2, the article can be removed from the transport hook by merely raising it so as to relieve the load from the support portion 54 and thereby allow the spring 70 to cause the jaw members 26 and 28 to return to the open position of FIG. 4.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. A transport hook for suspending and supporting an article from an elevated conveyor chain, said transport hook comprising a base adapted to be pivotally attached to the conveyor chain, a first jaw member mounted on said base for pivotal movement about a first pivot axis, a second jaw member having an upper end and a lower end, means pivotally mounting said second jaw member to said first jaw member at an intermediate portion thereof for pivotal movement about a second pivot axis, a spring extending between said first and second jaw members and normally maintaining the latter members in an open position, and a support portion formed on the lower end of said second jaw member and adapted to have said article mounted thereon so as to cause the weight of the article to draw the intermediate portion of the first jaw member downwardly relative to the base and simultaneously pivot the first jaw member about the first pivot axis into engagement with said article against the bias of said spring.

2. A transport hook for suspending and supporting an article from an elevated conveyor chain, said transport hook comprising a base adapted to be pivotally attached to the conveyor chain, a first jaw member mounted on said base for pivotal movement about a first pivot axis, a second jaw member having an upper end and a lower end, means pivotally mounting said second jaw member to said first jaw member at an intermediate portion thereof for pivotal movement about a second pivot axis, a spring having one end thereof connected to the lower end of said second jaw member and the other end thereof connected to the first jaw member adjacent said first pivot axis for normally maintaining the jaw members in an open position, and a support portion formed on the lower end of said second jaw member and adapted to have said article mounted thereon so as to cause the weight of the article to draw the intermediate portion of the first jaw member downwardly relative to the base and simultaneously pivot the first jaw member about the first pivot axis into engagement with said article against the bias of said spring.

3. A transport hook for suspending and supporting an article from an elevated conveyor chain, said transport hook comprising a base adapted to be pivotally attached to the conveyor chain, said base including a clevis supporting a first jaw member for pivotal movement about a first pivot axis, a second jaw member having an upper end and a lower end, means pivotally mounting said second jaw member to said first jaw member at an intermediate portion thereof for pivotal movement about a second pivot axis, a spring extending between said first and second jaw members and normally maintaining the latter members in an open position, a support portion formed on the lower end of said second jaw member and adapted to have said article mounted thereon so as to cause the weight of the article to draw the intermediate portion of the first jaw member downwardly relative to the base and simultaneously pivot the first jaw member about the first pivot axis into engagement with said article against the bias of said spring, and means connected to said base for controlling movement of said upper end of the second jaw member while said intermediate portion moves downwardly relative to the base.

* * * * *